United States Patent

[11] 3,573,749

[72] Inventors William R. Smith; Carl D. Southard; Walter D. Van Gieson, Jr., Raleigh, N.C.

[21] Appl. No. 811,288
[22] Filed Mar. 28, 1969
[45] Patented Apr. 6, 1971
[73] Assignee International Business Machines Corporation Armonk, N.Y.

[54] OPERATOR GUIDANCE AND CONTROL TERMIANL
7 Claims, 4 Drawing Figs.

[52] U.S. Cl. .......... 340/172.5
[51] Int. Cl. .......... G06f 3/04, G06f 3/14
[50] Field of Search .......... 340/172.5; 235/157

[56] References Cited

UNITED STATES PATENTS

| | | | |
|---|---|---|---|
| 3,281,797 | 10/1966 | Harris | 340/172.5 |
| 3,303,472 | 2/1967 | Chalker, Jr. et al. | 340/172.5 |
| 3,344,408 | 9/1967 | Singer et al. | 340/172.5 |
| 3,345,612 | 10/1967 | Goldman | 340/172.5 |
| 3,281,796 | 10/1966 | Neel | 340/172.5 |

*Primary Examiner*—Gareth D. Shaw
*Attorneys*—Hanifin and Jancin and John B. Frisone

ABSTRACT: A display and control terminal which in response to operator initiation is utilized to display operator guidance information and control the insertion of data in conformity with the displayed guidance information.

INVENTORS
WILLIAM R. SMITH
CARL D. SOUTHARD
WALTER D. VAN GIESON, JR

BY John B Osborne
ATTORNEY

OPERATOR GUIDANCE AND CONTROL TERMIANL

BACKGROUND

1. Field of the Invention

The invention relates to data collection systems generally and more specifically to a guidance and control terminal for guiding an operator in systems operation and simultaneously controlling the input devices specified in guidance information.

2. Description of the Prior Art

The use of computers for production control, inventory management, etc. has increased rapidly in the last few years. Most of the older systems utilized manual data collection and batch processing, therefore, the information generated, in most instances related to yesterday's, last week's or last month's activities. This data while extremely useful, often failed to indicate immediate pressing problems which, if solved as they occurred would have resulted in substantial savings.

In order to implement a real time control system, the data inputs must be made available as generated. In order to achieve this objective, persons unskilled in the use of data entry equipment such as lathe operators, etc. must insert data to the system via a wide variety of input devices. In most instances, a data entry requires that a plurality of devices such as card readers, badge readers and keyboards be used in succession.

If the data transmission and processing requirements of such a system are to be held within reasonable limits, it is necessary or at least desireable that these multiple entries be made in a fixed sequence since a fixed sequence reduces the data processing requirements and data only need be considered by the processor.

Prior systems have attempted to provide operator guidance by illuminating one or more preselected instructions depending on the nature of the transactions. In those instances where multiple instructions were displayed, the operator was unconstrained in the insertion of the data and the processor required provision for handling data in any or random order from the various input devices designated. In systems which displayed instruction only, the processor could theoretically operate more efficiently. The theoretical advantage, however, was seldom realized. With new or inexperienced operators, the system worked since these operators usually waited for each instruction and complied with them in the order in which they are received. Experienced operators proved to be the problem since they anticipated instructions and in many instances paid no heed to the instructions and attempted to insert data in many instances out of the prescribed sequence required for accuracy and efficiency.

SUMMARY OF THE INVENTION

The invention contemplates a guidance display and data input control system comprising, selective means for generating under operator control a first signal defining one of a plurality of unique transactions requiring the transmission of at least one type of data, means for receiving second signals from a control system, said second signals having a first portion identifying at least one unique instruction and a second portion identifying a unique data transmitter, means responsive to the first portion of the received second signal for displaying at least one guidance instruction to the operator, and means responsive to the second portion of the received second signal for enabling a unique data input device defined by the second portion of the second signal.

One object of the invention is to provide a guidance display and data input control system in which sequential guidance and control instructions are used to guide and control the input of data from at least one of several data input devices.

Another object of the invention is to provide a data collection system in which guided sequential inputs cannot be frustrated by improper operator action.

For foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
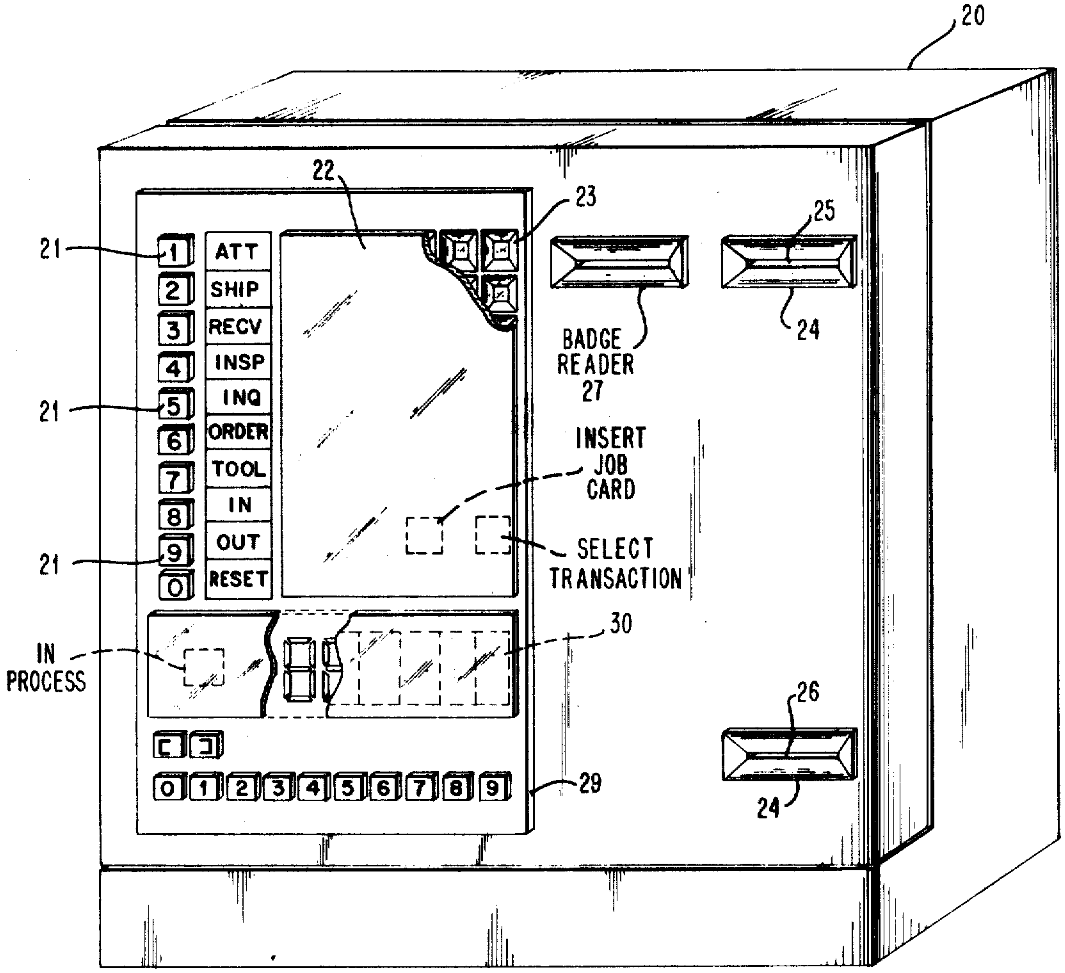
FIG. 1 is a perspective view of a guidance display and control terminal system constructed according to the invention.

In FIG. 1, a cabinet 20 includes a set of 10 interlocked transaction selector buttons 21 mounted on the front panel of cabinet 20. Adjacent buttons 21 are printed legends which identify various transactions which are indicated to a control system when any of the buttons adjacent thereto are depressed by an operator, thus if the button labeled 2 is depressed by the operator, it indicates to the central control system that a shipping transaction is to be entered. Shipping transactions, of course, will require inputting certain types of data relative to the material being shipped to the customer and various other things. When the operator depresses the button labeled 2 to indicate a shipping operation, this information is sent back to a control system which responds with an instruction. The instruction is displayed on an overlay 22 on the front cover of cabinet 20. 32 printed instructions on overlay 22 are each in registration with one of 32 lights 23 located under the overlay 22. The legends on overlay 22 become visible whenever a light in registration with the legend is illuminated.

A typical response by the central controller to the depression of button 2 indicating a shipping operation might be the illumination of an instruction on overlay 22 which might instruct the operator "insert job card" or any other instruction indicating an input of information which the operator is to perform. As soon as this instruction is displayed, the operator can insert data via the input device indicated on the display. If "insert job card" is indicated, a card bearing the legend job card must be inserted in the card reader 24 located within the cabinet 20 and having the card feed entry 25 and the card exit 26 protruding through the front surface of cabinet 20 before another entry can be made. A badge reader 27 is also located within the cabinet 20 and has a badge feed 28 protruding through the front surface of cabinet 20. In addition, a keyboard 29 and a six position display 30 are located on the front of cabinet 20. Keyboard 29 is provided with 12 keys for inputting data which is displayed on the illuminated display 30 located above it on the front panel of cabinet 20. As data is entered into this keyboard, it is shifted from the entry position at the right to the left and as many as six digits may be entered and displayed. The badge reader 27, card reader 24 and keyboard entry and display device 29 and 30 are illustrated here only as examples of different types of input devices which may be used with the unique transaction selector and display which will be described in greater detail in the course of the description. Therefore, the details of these various input devices will not be disclosed since any number or variety of these devices may be selected to fit any particular application.

Transaction selector buttons 21 are of the conventional interlock type and each makes a single switch closure. Thus when buttons 1 through 9 are depressed, they will remain depressed and none of the other buttons in the group can be depressed until the button which has been previously depressed is released by depressing the zero or reset button. When a transaction is completed, the first step of that transaction is then displayed on the overlay 22. Thus, if the operator wishes to select a different transaction than that indicated by the depressed button, he must first reset the device by pressing the transaction selector button labeled zero. When this is done, a "select-transaction" instruction will be illuminated and displayed on the overlay 22. The next step is to depress the proper transaction selector button. If the operator desires to perform a "receive-transaction," he will depress button 3. This information will be communicated to the central control device. The central control device will then send a guidance signal which will indicate the first step in the selected transaction. The guidance signal is a two-part signal, the first part of which will illuminate the light 23 under the appropriate first instruction and the second part of which will enable the input device indicated to be used by that instruction. When the appropriate input device is activated, the transaction information is again identified to the central station, thus reducing the amount of data which the central station must retain. The guidance information that was previously sent in the last operation is returned to the central again reducing the burden on the central control and the data from the activated and previously selected media is returned to the central control device. Upon completion, the end of the subtransaction is signaled and the central station returns a second two-part guidance signal which identified the second or next step in the sequence predetermined for this transaction. Again the transmission of the data via the activated medium, as identified by the second guidance signal, causes a repeat of the above step. These steps are repeated until all of the guidance signals for that particular transaction have been processed and the device is left at the first step for the previously selected transaction, that is transaction 3. If another receiving transaction is to be completed, all the operator has to do at this time is to transmit data via the activated appropriate input media.

This control system is particularly suitable for attendance recording, thus during shift change periods or other periods when employees are clocking in and out such as lunch, the attendance selection button can be depressed to indicate an attendance transaction and badges may be inserted into the device sequentially since this transaction is a one-step transaction requiring merely the insertion of a badge. As each badge is removed, the system is ready to accept the next badge since the same instruction and guidance is utilized.

The disclosed system has been specifically designed for use with the time division multiplex communication system disclosed in application Ser. No. 791,334 filed Jan. 15, 1969, and assigned to the same assignee as this application and hereinafter referred to as the communications system. It is not however, limited to use with such a system and may with minor modification be used in conjunction with a wide variety of currently available communications systems.

Figure 2A:
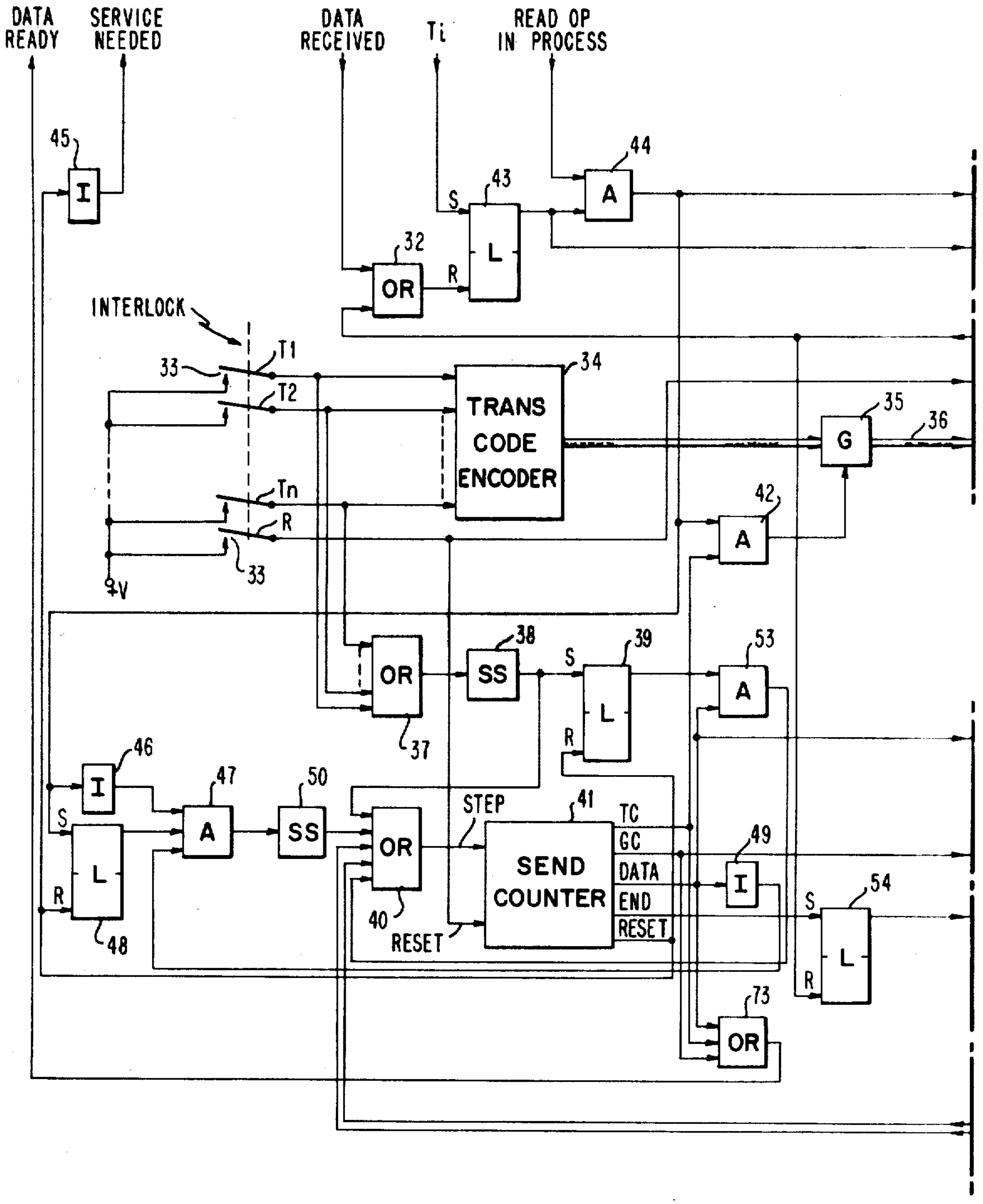
FIG. 2 is a planned view of the arrangement of FIGS. 2A and 2B, and FIGS. 2A and 2B are a schematic block diagram of the system illustrated in FIG. 1.
Figure 2:
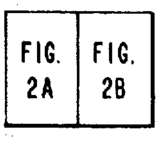
Figure 2B:
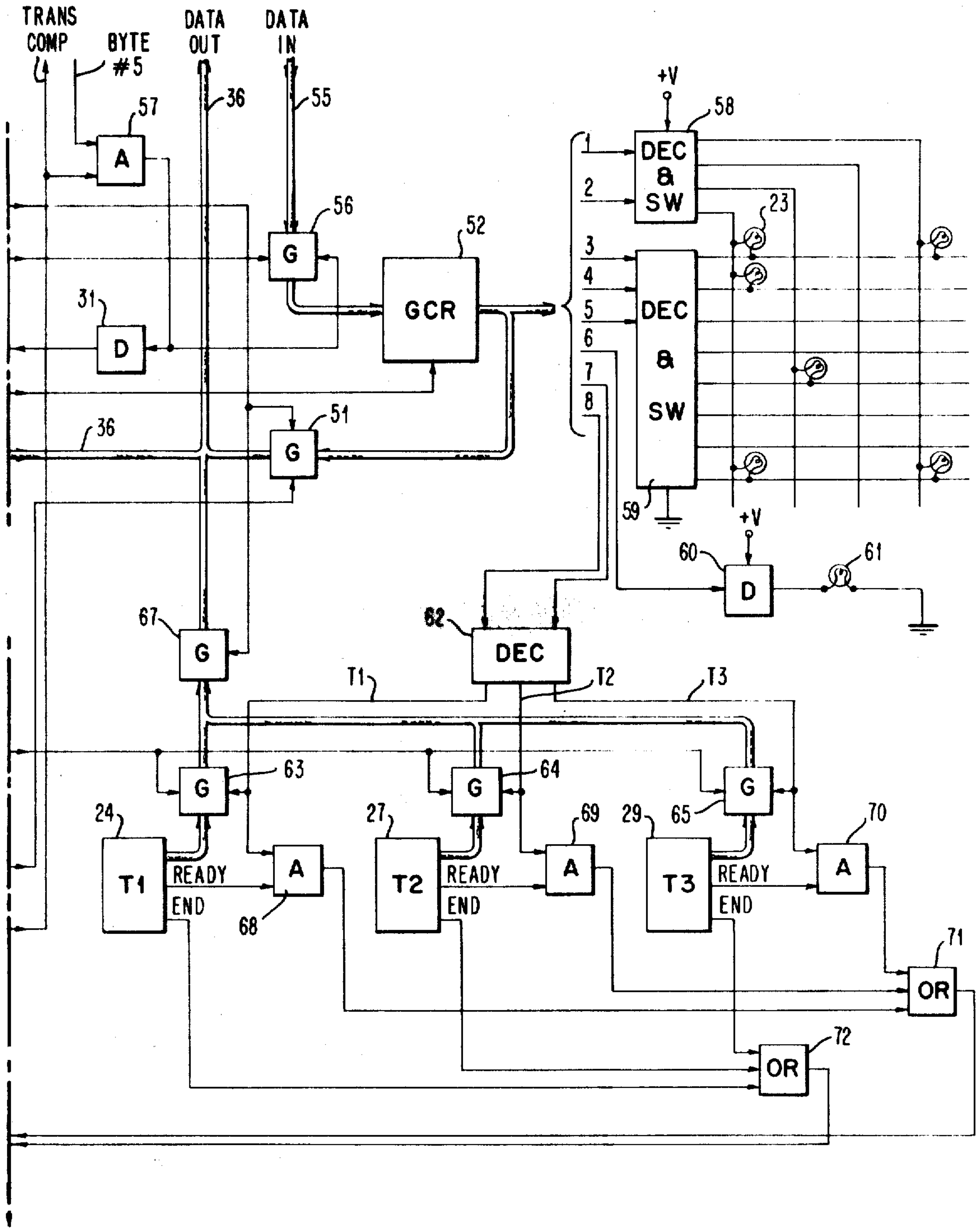

IN FIG. 2, elements shown and previously described in FIG. 1 bear the same reference numeral. The switches 33 associated with transaction selector buttons 21 have one side connected to a positive voltage source +V and the other side connected to a transaction code encoder circuit 34. The switch associated with the reset button has one side connected to the positive voltage source +V, however its other side is not connected to encoder 34. Thus when one of the transaction selector switches 21 is depressed, as previously described, the switch 33 associated therewith connects source +V through the switch to transaction code encoder 34 which supplies a unique 8-bit code to identify which of the transaction selector buttons 21 has been depressed. The code from transaction code encoder 34 is applied to a gate circuit 35 which will at an appropriate time place the unique code on an out bus 36 which is connected to the local control circuit of the communications system.

Switches 33 in addition to being connected to transaction code encoder 34 are also connected to an OR circuit 37 which has its output connected to a single-shot circuit 38. The output of single-shot circuit 38 is applied to the set input of a latch 39 and to one input of an OR circuit 40 which has its output connected to the step input of a send counter circuit 41. Send counter circuit 41 is normally in the reset condition, thus when one of the switches 33 is closed, the counter is stepped from the reset condition to the first position labeled TC, transaction code. The transaction code or TC output which is the first position of the counter 41 is connected to an AND circuit 42 which will enable gate 35 when the other input of AND circuit 42 is activated. The other input of AND circuit 42 is enabled by the local control unit of the communications system. Two signals from the control unit "read operation in process" and the set output of a latch 43 connected to the terminal selected signal T*i* are applied to an AND circuit 44 the output of which enables gate 42.

The reset output of counter 41 is connected via an inverter circuit 45 to the "service needed" line to the local control unit of the transmission system. Thus as soon as counter 41 is stepped from the reset condition to the first position, that is TC, the inverter 45 signals the need for service. This is handled as described in the referenced description of the communications system and the "read operation in process" and terminal selected signal "T*i*" are provided by the communications system.

The output from AND circuit 44 is applied via an inverter 46 to one input of AND circuit 47. In addition, the output of AND circuit 44 is also applied to the set input of a latch 48. The output of latch 48 is connected to a second input of AND connected 47. A third input to AND circuit 47 is connected via an inverter 49 to the data line output of send counter 41, thus as soon as T*i*, that is the terminal, has been selected and "read operation in process" are provided, the output of AND circuit 44 sets latch 48, thus conditioning one of the inputs to the AND circuit 47. Since send counter is in the first position TC inverter 49 conditions the second input of AND circuit 47 and as soon as the information has been transmitted from transaction code encoder 34 via gate 35 to the local control unit in the transmission system to indicate a completion of the sending of data, the data recieved signal is returned from the control unit and resets latch 43 via an OR circuit 32. As soon as latch 43 is reset, the output of AND circuit 44 falls and via inverter 46 and AND circuit 47 triggers a single-shot circuit 50 which is connected to one input of OR circuit 40 and via OR circuit 40 to the step input of send counter 41 thus stepping the counter from TC to GC which stands for guidance code.

The GC output of send counter 41 is connected to one input of a gate circuit 51. The other enabling input of gate 51 is connected to the output of AND circuit 44 and is controlled as previously described. Gate 51 controls 8-bits on eight parallel lines from a guidance character register 52. If the reset switch 33 has been depressed, register 52 is in a reset condition and the code contained therein is transmitted via the out bus 36 and gate 51 to the central control system following the transmission of the transaction code from encoder 34 described above. Again the data receive signal resets latch 43 as previously described and via inverter 46, AND circuit 47 and single-shot 50, the counter 41 is stepped from guidance character to the data position of the counter which is the next sequential counter position.

Following an initiation as described above, that is the changing of a transaction code from an existing transaction code to another by depressing the reset transaction code button 21, latch 39 is initially set. The set output of latch 39 is connected to an AND circuit 53 along with the data output from counter 41. Thus the output of AND circuit 43 which is connected directly via OR circuit 40 to the step input of send counter 41 and causes it to step through the data mode stage without pausing to send data. This is necessary since the guidance character register 52 is in a reset condition and cannot control a data input at this time. After send counter 41 steps, it steps to an end position which sets a latch 54. The set output of latch 54 is connected to the transfer complete line to the local communications system control unit. This indicates to the local control unit that the transfer has been completed. This data is passed onto the central system which properly responds and returns an end acknowledgement which includes in the fifth byte position of the acknowledging frame the new guidance character dictated by the control system. This guidance character is inserted in register 52 via an in bus 55 and a gate circuit 56. Gate circuit 56 is controlled by the byte number 5 signal generated in the local control unit and the set output of latch 54. Both signals are applied to an AND circuit 47 which has its output connected to one of the two control inputs of gate 56. The other control input is connected to the set output of latch 43. Latch 54 is reset by the output of gate 57 which is delayed by a delay circuit 31 to assure sufficient time for the new guidance character in byte number 5 of the communications frame to be inserted, via gate 56, in register 52. The output of delay circuit 31 is applied via OR circuit 32 to the reset input of latch 43 since the data received signal is not available on an ending sequence.

Send counter 41 is again stepped as previously described to the reset position. As soon as send counter 41 resides in the reset position, the service needed line goes down. The steps thus far described have identified to the central control system, the type of transaction which is required, the contents of the guidance character register 52 and have caused these contents to be altered by that control system to a new guidance. The contents of the guidance character register have three functions. These will be described below.

In the preferred embodiment, the guidance control register has eight positions. Positions 1 and 2 are used to control the vertical column of a matrix of displayed lights 23 which in cooperation with overlay 22 display the selected guidance. Positions 3, 4 and 5 are used to control horizontal conductors of the light matrix. Positions 1 and 2 are applied to a decoder circuit 58 which decodes the code applied on lines 1 and 2 from guidance control register 52 into one of four lines. Thus applying ±V to the selected vertical line of the light matrix. .Lines 3, 4 and 5 are applied to a second decoder circuit 59 which decodes the three lines from register 52 into one of eight lines. The decoded line is connected to ground, thus completing a circuit from +V through one of the lights 23 to ground to illuminate the in registration guidance instruction printed on the overlay 22 shown in FIG. 1.

In addition, output number 6 from guidance character register 52 is connected to a driver circuit 60 for controlling the illumination of a lamp 61 which indicates when lit that the transaction in process requires steps in addition to the step being currently displayed. Light 61 goes out when the last step is indicated and is not illuminated for single step transactions. Outputs 7 and 8 are applied to a decoder 62 which provides one of three outputs depending upon the values of output lines 7 and 8. How the outputs of decoder 62 are utilized will be described below.

The data lines from terminals 24, 27 and 29 are connected to data gates 63, 64 and 65 respectively. The outputs of data gates 63, 64 and 65 are connected in parallel to a data gate 67 which is connected to the data output bus 36. Gates 63, 64 and 75 are connected to the third output from counter 51 which indicates the data mode of operation. And in addition, each of the gates receives one of the unique outputs from decoder circuit 62, thus in send data mode and with the appropriate output from decoder 62, one of gates 63, 64 and 65 is enabled for transmitting data via gate 67 to the data out bus 36. Gate 67 is enabled by the output of AND circuit 44 and thus transmits data to the data output bus at the appropriate time under control of the control unit in the communications network.

Terminals 24, 27 and 29 each provide a ready signal. This ready signal is connected to one input of AND gates 68, 69 and 70, respectively. The other inputs of AND gates 68, 69, and 70 are connected to the associated outputs of decoder 62. Thus when decoder 62 indicates that a terminal has been selected via outputs 7 and 8 from guidance character register 52 and that terminal is ready, the associated AND gates 68 through 70 signals the condition. The output of AND gates 68 through 70 are connected via an OR circuit 71 and OR circuit 40 to the step input of send counter 41 causing it to go from the reset state to the TC state for transmitting the transaction code. This will be followed by the guidance code and the data. The data at this time will be transmitted since latch 39 has been previously reset by the reset condition of send counter 41 and thus AND gate 53 is disabled and does not provide the immediate step of send counter 41 via OR circuit 40. The data output of send counter 41 enables gates 63, 64 and 65. This along with one of the outputs of decoder 62 will send the appropriate data from the appropriate terminal 24, 27 or 29 via OR gates 63, 64 or 65 as the case may be.

Terminals 24, 27 and 29 in addition provide a signal indicating that transfer of the data has been completed. This signal is applied via an OR circuit 72 and OR circuit 40 to the step input of counter 41 to cause the counter to step from data condition to end condition at which point latch 54 is set and operation continues as previously described. During the end condition, the next guidance character to be used for the select transaction is sent via the control system and the communication system to guidance character register 52 as previously described. This would normally entail enabling another terminal unit whereby additional data for the particular transaction would be sent by the operator in the same manner as described above.

The communications system utilized for communicating between the terminal device described here and the central control system requires a data ready signal. This signal is necessary during the periods for each element or sequence of a transaction thus the TC, GC and data output lines of send counter 41 are connected via an OR circuit 73 to the data ready lines of the communications system local controller.

OPERATION OF THE INVENTION

It will be assumed that the operator wishes to change the transaction currently displayed which is controlled by the guidance character in the guidance character register 52. In order to do this, he must depress the reset button and close switch 33 associated therewith. As soon as switch 33 is closed, the counter 41 is reset, if not in the reset condition, and the contents of register 52 are reset.

In the reset condition of register 52, decoder 62 provides no outputs, light 61 is extinguished and a single light in the matrix of lights 23 is illuminated which instructs the operator to select the transaction. At this time nothing will happen until the operator closes one of the switches 1 through 9 which define one of the allowable transactions. We will assume for the moment that the transaction that the operator selects will involve inputting three types of data. That is, badge data, card data and a keyboard entry.

When the operator selects the transaction by depressing the appropriate pushbutton 21 closing the associated switch contact 33, the code defining that transaction is generated by transaction code encoder 34 and applied to the input of gate 35. In addition, the voltage from source +V is applied via the associated switch 33 and OR gate 37 to single-shot circuit 38. The output of single-shot circuit 38 sets latch 39 to indicate that this is the first sequence in the transaction. In addition, the output of a single-shot circuit 38 is applied via OR circuit 40 to the step input of send counter 41 which is in the reset condition. This steps the counter from the reset condition which is the terminal condition of the counter to the first condition which is labeled TC or transaction code. At this time, the data ready line is activated to indicate that data is available and service needed is also indicated since the send counter 41 does not reside in the reset condition. The service needed signal is generated via inverter 45 connected to the reset output of counter 41.

When communications are available for this terminal, the Ti signal is supplied by the communications network. This sets latch 43. In addition, the communications terminal indicates that a read operation is now in process. Both the set output of latch 43 and the read operation in process signal are applied to AND gate 44, thus enabling gate 35 via AND circuit 432 which has the output of AND 44 and the TC line from send counter 41 connected thereto. Data is sent out via the out bus 36 to the communications network for transfer to the central control computer or device. When the communications network receives the data, it signals back with the data received signal which resets latch 43 causing the output of AND circuit 44 to go down. The output of AND circuit 44 had previously set latch 48 and as soon as the output of AND circuit 44 goes down, single-shot 50 provides an output via OR circuit 40 to step the send counter 41 from the transaction code position to the guidance character position. This is accomplished via inverter 46 and AND circuit 47.

As soon as counter 41 steps to the guidance character or second position, the data ready signal is again provided. The second output of counter 41, guidance character, is also applied to gate 51 and with the output of AND circuit 44 which is generated as previously described, the contents of guidance register 52 are transmitted via gate 51 to the out bus 36 to the communications system. Again data recieved, resets latch 43 causing send counter 41 to step to the data position as previously described. Here as previously described because latch 39 is set, the counter is immediately stepped to the end position of the counter and no data is sent at this time since none of the gates 63 through 65 are enabled because of the reset condition previously entered into guidance character register 52.

In the end condition, the latch 54 is set signalling that the transfer of data for this first sequence has been completed. Transfer complete signal from the set output of latch 54 and the byte number 5 signal are applied to AND gate 57 which along with the set output of latch 43 permits the entry of the next guidance character from the in bus 55 via gate 56. The delayed output of gate 57 resets latch 54 and latch 43. As soon as latch 43 is reset, AND gate 44 is disabled and the send counter 41 is stepped as previously described via OR circuit 40 and single-shot 50. This causes send counter 41 to reside at the reset position.

The new guidance character introduced into guidance character register 52 at the generation of transfer complete will now control the inputting of data via decoder 62. In addition, position 1 through 5 will indicate which action the operator is to take via the display of data on overlay 22 in registration with the illuminated light. Light 61 will be on to indicate that additional steps are required in the course of executing or completing the selected transaction. As previously described, the selected terminal will via OR circuit 71 step send counter 41 as soon as the data is ready at the terminal.

When the data is ready, counter 41 is stepped to the TC position at which point the transaction code identified by the depressed button is returned to the central controller system. This will be followed by the guidance character residing in guidance control register 52 again as previously described. However, on this cycle, the data cycle will be activated since the latch 39 has been reset and AND gate 53 is disabled. Data will be sent as described above from the selected terminal. During the end cycle, the next guidance character for the transaction will be sent over the in bus 55 as described above for the first.

This process will be repeated for each of the three terminals which are to be activated to send data. When the last guidance character for the input of data is sent, the sixth bit position will be changed to extinguish light 61 to indicate that this is the last step. After the last step of the transaction has been completed, the first guidance character of the selected transaction will be returned via the in bus 55 as previously described to the guidance character register 52, thus additional inputs of data for this particular transaction may be completed without resetting and setting the appropriate transaction buttons 21. This is extremely useful in attendance recording which is a single step input, i.e. a single badge insertion. In this mode, badges can be placed into the badge reader one after the other without going through the reset and setting operation of the guidance button 21 thus improving the walk through rate of the attendance recording.

While the invention has been particularly shown and described with respect to a preferred embodiment, it will be understood by those skilled in the art that various changes in form and detail may be made therein without departing from the spirit and scope of the invention.

We claim:

1. A guidance display and data input terminal controller suitable for use in a computer controlled date collection system comprising:

selectively operable means under control of an operator for providing a first unique signal identifying one of several different transactions selected by an operator to the computer;

means for receiving from the computer second signals which are in response to said first signal and include first and second parts, said first part defining a unique guidance instruction and said second part defining a control function for enabling one of several data input terminals;

means responsive to the first part of said received second signal for displaying the unique guidance instruction defined by the said first part; and means responsive to the second part of said received second signal for enabling a data input device defined by the said second part and which corresponds to the displayed guidance instruction whereby data from said data input device may be transitted to the computer.

2. A guidance display and data input terminal controller suitable for use in a computer controlled data collection system comprising:

selectively operable means under operation control for providing a first unique signal identifying one of several different transactions selected by the operator and an indicia of its selected state to the computer;

means for receiving from the computer in sequence a plurality of second signals each of which includes a first part for defining a unique guidance instruction and second part defining a control function for enabling one of several data input terminals, said computer supplying successive second signals in the sequence upon the operation of the terminal device designated by the second part of the signal and supplying the initial second signal of the sequence at the termination of the sequence;

means responsive to the first part of said received second signal for displaying at any given time the unique guidance instruction defined by the received signal; and means responsive to the second part of said received second signal for enabling the data input terminal designated the said second part, said enabled terminal corresponding to the displayed guidance instruction whereby data from said data input terminal may be transmitted to the computer.

3. A guidance display and data input terminal control system as set forth in claim 2 in which:

said means for receiving the second control signals includes a multiposition register for receiving and storing a multibit binary signal;

said means responsive to the first part of the second signal includes decoder means responsive to predetermined register positions for supplying signals for controlling a visual display for displaying a guidance instruction corresponding to the binary bits in the predetermined register positions; and said means responsive to the second part of the second signal includes decoder means responsive to other predetermined register positions for supplying signals for controlling gate means for selectively enabling a specific input terminal device corresponding to the binary bits in the other predetermined register positions.

4. A guidance display and data input terminal control system as set forth in claim 2 in which: said selectively operable means under operator control includes a plurality of selectively operable switches, encoding means responsive to said switches for generating a unique binary coded signal for each switch closure, and means responsive to a switch closure for making the unique binary code generated by the encoder available for transmission to the computer.

5. A guidance display and data input terminal controller suitable for use in a computer controlled data collection system comprising:

selectively operable means under control of an operator for providing a first unique signal identifying one of several different transactions selected by an operator and in indicia of the selected state to the computer;

gate means responsive to said first selectively operable means for controlling the transmission of said first signal;

guidance control register means for receiving from the computer in sequence, a plurality of second signals each of which includes a first part for defining a unique guidance instruction and a second part for defining a control function for enabling one of several data input terminals;

multiposition counter means providing a multiple number of outputs;

means responsive to said selectively operable means for stepping said counter to a first position from a reset position for enabling the gate means responsive to the selectively operable means under operator control whereby data may be sent to the computer;

means responsive to the transmission of data to the computer for causing said counter means to step from its previously attained position to the next sequential position upon the successful sending of data;

means responsive to the next counter position for enabling the transmission of the contents of the guidance control register means to the computer;

means responsive to predetermined register positions of the guidance control register means for supplying signals for controlling a visual display which displays a guidance instruction corresponding to the contents of the predetermined register position;

means responsive to other predetermined guidance control register means positions for supplying signals for controlling and selectively enabling one of a plurality of input terminal devices corresponding to the contents of the other predetermined register positions;

means responsive to an enabled terminal device which is ready to send data for stepping said multiposition counter means to the next sequential position; and means responsive to the transmission of data by one of the enabled terminals for stepping the said counter means to the next subsequent position from a previously attained position.

6. A guidance display and data input terminal control system as set forth in claim 5 in which reset means are provided for resetting said guidance control register means to a predetermined position and for resetting said counter means to a reset position.

7. A guidance display and data input terminal control system as set forth in claim 6 in which said counter means includes at least five positions, said first position enabling the transfer of the unique first signal, said second position enabling the transmission of the contents of the guidance control register means, said third position enabling the transmission of a terminal selected by the second portion of the said second signal, said fourth position indicating and end to the transfer of the information and said fifth position indicating a reset condition in which no action is taken.

PO-1050
(5/69)

UNITED STATES PATENT OFFICE
CERTIFICATE OF CORRECTION

Patent No. 3,573,749 Dated April 6, 1971

Inventor(s) William R. Smith, Carl D. Southard, Walter D. Van Gieson, Jr.

It is certified that error appears in the above-identified patent and that said Letters Patent are hereby corrected as shown below:

Claim 1, Column 8, line 6, delete "date" and insert --data--.

Claim 2, Column 8, line 30, delete "operation" and insert --operator--.

Claim 7, Column 10, line 29, delete "and" and insert --an--.

Signed and sealed this 24th day of August 1971.

(SEAL)
Attest:

EDWARD M.FLETCHER,JR.
Attesting Officer

WILLIAM E. SCHUYLER, JR.
Commissioner of Patents